United States Patent
Ohira

(10) Patent No.: US 8,107,738 B2
(45) Date of Patent: Jan. 31, 2012

(54) IMAGE PROCESSING METHOD, IMAGE PROCESSING APPARATUS, IMAGE FORMING APPARATUS, IMAGE READING APPARATUS AND MEMORY PRODUCT

(75) Inventor: Masakazu Ohira, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 804 days.

(21) Appl. No.: 12/233,348

(22) Filed: Sep. 18, 2008

(65) Prior Publication Data

US 2009/0087098 A1    Apr. 2, 2009

(30) Foreign Application Priority Data

Oct. 2, 2007    (JP) .................. 2007-259164

(51) Int. Cl.
*G06K 9/00* (2006.01)
*H04N 1/40* (2006.01)

(52) U.S. Cl. ........................ 382/218; 358/448

(58) Field of Classification Search .................. 382/162, 382/190, 209, 218, 235, 276, 307; 348/129, 348/161, 179; 358/3.23, 448, 462, 530; 704/221, 704/236, 243, 247
See application file for complete search history.

(56) References Cited

U.S. PATENT DOCUMENTS 5,384,647 A * 1/1995 Fukushima .................... 358/2.1
5,465,353 A * 11/1995 Hull et al. .......................... 1/1

FOREIGN PATENT DOCUMENTS

| EP | 1 914 680 A1 | 4/2008 |
| JP | 7-282088 A | 10/1995 |
| WO | WO-2006/092957 A1 | 9/2006 |

OTHER PUBLICATIONS

Noguchi et al., "Cascading Approximate Nearest Neighbor Searchers and Its Effects on Object Recognition," The Institute of Electronics, Information and Communication Engineers, IECE Technical Report, DE2007-18, PRMU2007-44, pp. 99-104 (2007).

\* cited by examiner

*Primary Examiner* — Abolfazl Tabatabai
(74) *Attorney, Agent, or Firm* — Birch, Stewart, Kolasch & Birch, LLP

(57) ABSTRACT

In storing of a document page index of a reference image in association with each hash value calculated for each reference image by the features calculating section, a storage processing section determines whether the number of document page indexes, which have already been stored in association with each hash value, is larger than or equal to a preliminarily setup upper limit value or not. The storage processing section stores the document page index of a reference image in a hash table in association with the hash value calculated by the features calculating section when the number of document page indexes, which have already been stored, is smaller than the upper limit value, or invalidates the hash value when the number of document page indexes, which have already been stored, is larger than or equal to the upper limit value.

8 Claims, 16 Drawing Sheets

F I G. 4

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

| HASH VALUE | DOCUMENT PAGE INDEX |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 10B

| HASH VALUE | DOCUMENT PAGE INDEX |
|---|---|
| H1 | ID1、ID1 |
| H2 | ID1 |
| H3 | ID1、ID2 |
| H4 | ID1 |
| H6 | ID1、ID2 |
| ⋮ | ⋮ |

FIG. 11A

| HASH VALUE | DOCUMENT PAGE INDEX |
|---|---|
| H1 | ID1 |
| H2 | ID1 |
| H3 | — |
| H4 | ID1 |
| H5 | ID1 |
| H6 | ID1、ID2 |
| ⋮ | ⋮ |

FIG. 11B

| INVALID HASH VALUE | H3, H16, H32 ⋯ |
|---|---|

FIG. 11C

| INVALID HASH VALUE FLAG | HASH VALUE | DOCUMENT PAGE INDEX |
|---|---|---|
| 0 | H1 | ID1 |
| 0 | H2 | ID1 |
| 1 | H3 | |
| 0 | H4 | ID1 |
| 0 | H5 | ID1 |
| 0 | H6 | ID1、ID2 |
| ⋮ | ⋮ | ⋮ |

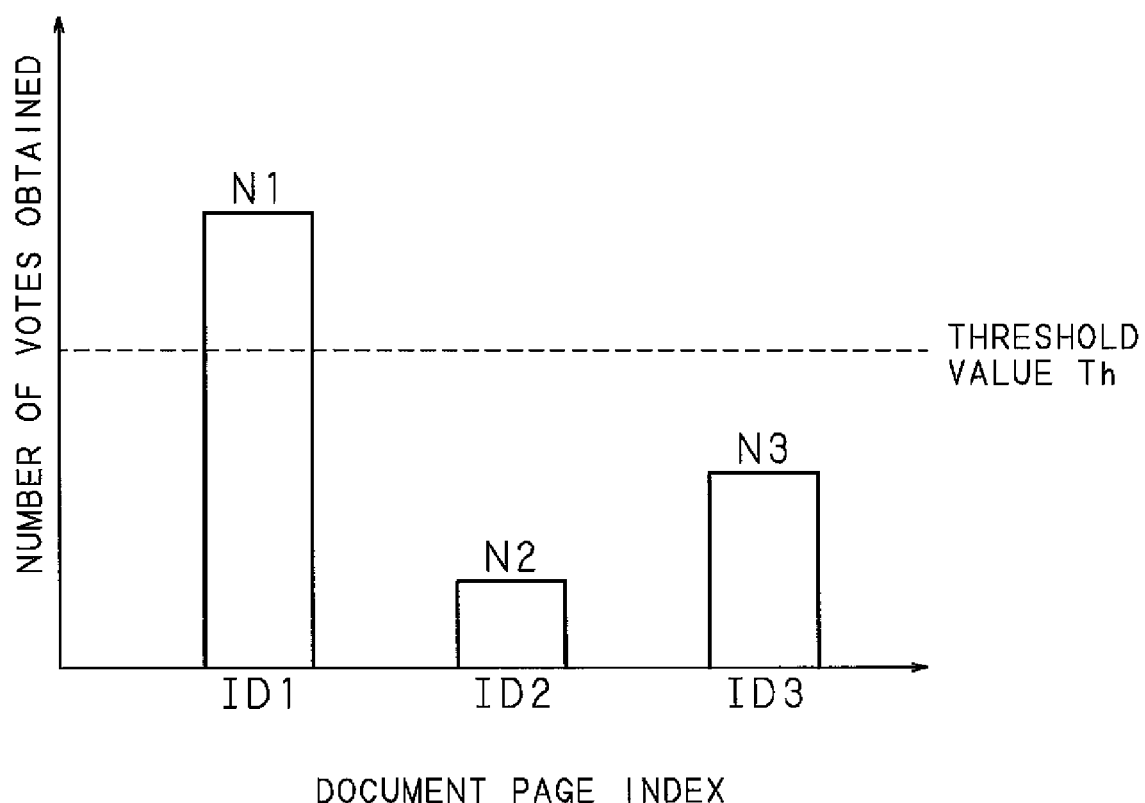
F I G. 1 2

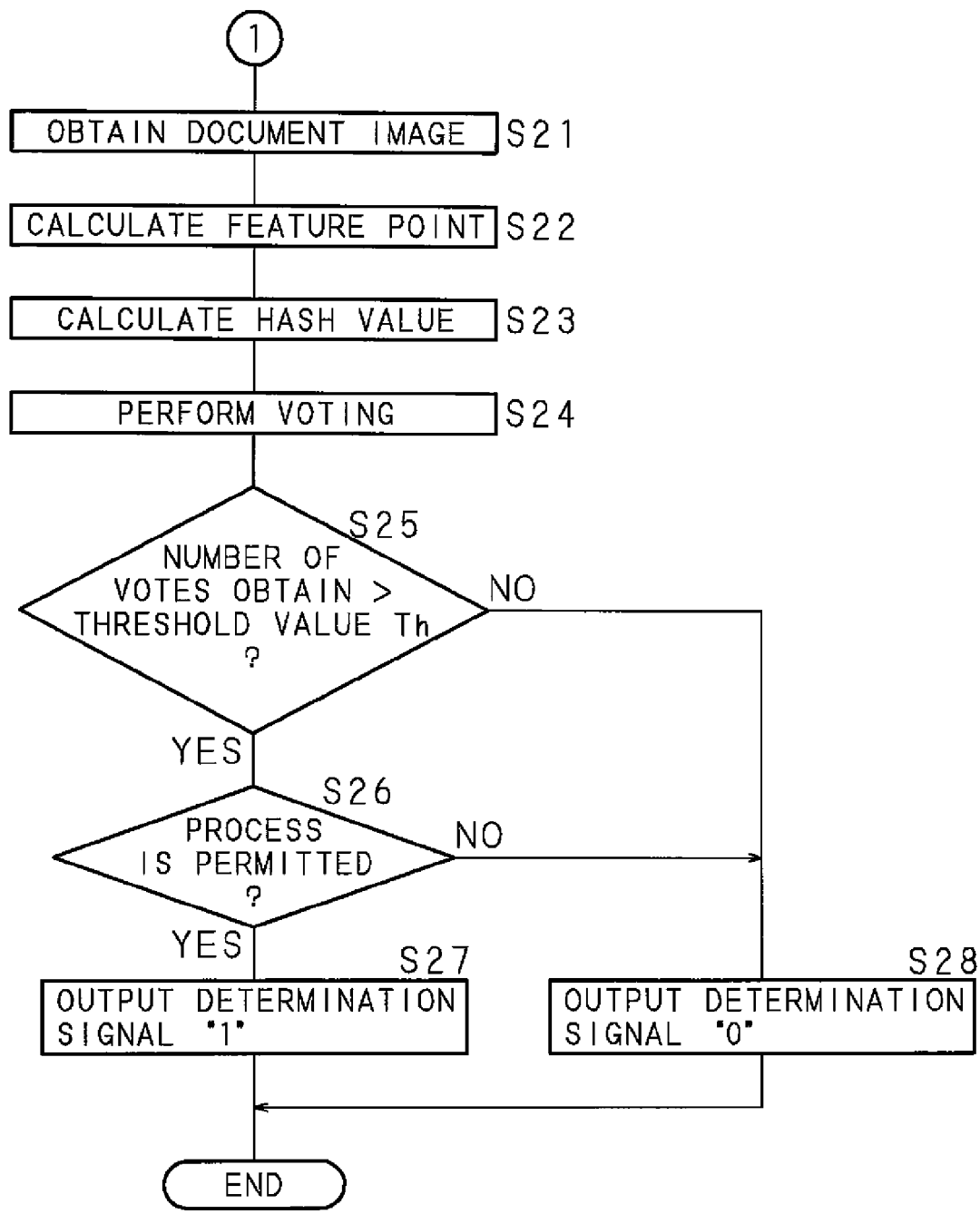

IMAGE PROCESSING METHOD, IMAGE PROCESSING APPARATUS, IMAGE FORMING APPARATUS, IMAGE READING APPARATUS AND MEMORY PRODUCT

CROSS-REFERENCE TO RELATED APPLICATION

This non-provisional application claims priority under 35 U.S.C. §119(a) on Patent Application No. 2007-259164 filed in Japan on Oct. 2, 2007, the entire contents of which are hereby incorporated by reference.

BACKGROUND

1. Technical Field

The present invention relates to: an image processing method and an image processing apparatus for judging whether an inputted image is similar to a preliminary reference image or not on the basis of features obtained from the inputted image; an image forming apparatus and an image reading apparatus employing the image processing apparatus; and a memory product which records a computer program for realizing the image processing apparatus.

2. Description of Related Art

Proposed as an image processing for matching image data obtained by reading a document with a scanner with a predetermined image data stored in advance so as to judge the similarity of the images are, for example, a method for extracting keywords from an image with an OCR (Optical Character Reader) and judging the similarity of images on the basis of the extracted keywords. In another method, documents where similarity judgment is to be performed are limited to sheet forms containing ruled lines and then features of the ruled lines are extracted so that similarity of the image is judged.

Further, proposed is a matching apparatus for extracting features of an input document to generate a descriptor and matching the generated descriptor with descriptors stored in advance in a descriptor database, so as to perform matching of the input document and the descriptor in the descriptor database (see Japanese Patent Application Laid-Open No. H7-282088).

In the device disclosed in Japanese Patent Application Laid-Open No. H7-282088, descriptors and a list of documents including the features which the respective descriptors are generated, are stored in the descriptor database. The descriptors are generated to be unchanged by distortion caused by digitalization of a document, a difference between an input document and a matching document in a document database, and the like. The device disclosed in Japanese Patent Application Laid-Open No. H7-282088 accumulates votes for the respective documents in the document database when the descriptor database is scanned, and determines that one document obtaining the largest number of votes or a document obtaining the number of votes, which exceeds a threshold, is a matching document.

Also proposed is a device, which is used for an image taken by a digital camera, an image read by a scanner or the like, for obtaining the centroid of a connected part of an image as a feature point assuming that the connected part is a word component, calculating a geometric invariant using said feature point, further obtaining features from the geometric invariant, storing the features, an index representing the feature point and an index representing the image in a hash table, obtaining a feature point, the features and an index representing the feature point from an input image (query) by a similar process in retrieval of an image, and voting for an image which is stored in the hash table in advance so as to carry out retrieval (see International Publication Pamphlet No. 2006/92957).

Described in the International Publication Pamphlet No. 2006/92957 are to extract feature points from a wide range for use in calculation of one features, to increase the number of feature points, and the like in order to improve the accuracy of the features. Moreover, in International Publication Pamphlet No. 2006/92957, it is possible to restrain reduction of the accuracy of determination of image retrieval by preliminarily recording correspondence of feature points in an input image and points in a reference document and not voting for a point, which has already been associated, in voting for an image stored in advance, so as to prevent incorrect voting. Also described in International Publication Pamphlet No. 2006/92957 is that the accuracy of determination of image retrieval decreases when more pages of images are stored in the hash table and it is assumed that the reason thereof is an increase in the chance for storage of a different document having the same features.

SUMMARY

The descriptor database in Japanese Patent Application Laid-Open No. H7-282088 has a table form structure wherein a finite number of data are stored for one descriptor, not a list structure wherein infinite elements can be stored. When a descriptor database is thus implemented in a table form having a fixed size, the number of data to be stored for one descriptor is the sum of the number of descriptors extracted from each of all documents stored in the descriptor database. Since the descriptor database becomes huge in size when too many descriptors are extracted from one document, it is desirable to reduce the number of descriptors to be extracted in this case. It should be noted that the performance of image retrieval is improved when reduced is a descriptor which may cause an undetectable error or a deterministic mistake in image retrieval.

Also described in Japanese Patent Application Laid-Open No. H7-282088 is that it is unnecessary in image retrieval to use all of the descriptors stored in the descriptor database since descriptors are redundant and, for example, it is possible to retrieve an image using only a high-quality, i.e., accurate descriptor. Accordingly, even when a character in one document is damaged by noise, it is possible to carry out matching on the basis of a descriptor if there is still a descriptor free of influence from noise in the document, in the case of matching based on a plurality of stored descriptors.

The Japanese Patent Application Laid-Open No. H7-282088, however, does not describe a problem that the same descriptor may be extracted from a plurality of different documents. When the same descriptor is extracted from a plurality of different documents, said descriptor applies to all of the documents from which said descriptor is extracted and, therefore, said descriptor is not meaningful to identification of a document but rather causes incorrect judgment of a similar image.

Moreover, the International Publication Pamphlet No. 2006/92957 does not describe that the influence of an invalid features on the accuracy of determination varies depending on the number of reference images stored in the hash table in advance, and has a problem that the accuracy of determination decreases when the number of reference documents is small.

The present invention has been made with the aim of solving the above problems, and it is an object thereof to provide an image processing method by which the similarity of images can be judged with a high degree of accuracy; an image processing apparatus; an image forming apparatus and an image reading apparatus which comprise the image processing apparatus; and a memory product which records a computer program for realizing the image processing apparatus.

In an image processing method according to the present invention, storage section for storing plural kinds of features and a plurality of reference images in association with each other is provided, features is extracted from an inputted document image, and whether the document image is similar to a reference image or not is judged based on the extracted features and plural kinds of features stored in the storage section. An image processing apparatus, when an inputted image gets stored as a reference image in the storage section, extracts features from the inputted image and determines whether the number of reference images stored in the storage section in association with the extracted features is larger than or equal to a predetermined number or not. The image processing apparatus stores the inputted image in the storage section as a reference image in association with the extracted features when the number of reference images is smaller than the predetermined number, or invalidates the features when the number of reference images is larger than or equal to the predetermined number. Accordingly, the image processing apparatus judges whether the document image is similar to a reference image or not on the basis of plural kinds of features, which are not invalidated, among features stored in the storage section.

It should be noted that the above image processing apparatus may be realized by a computer. In this case, a program for causing a computer to operate as the above respective means so as to realize the above image processing apparatus with the computer, and a computer-readable memory product which records said program are also within the scope of the present invention.

The present invention enables high-accuracy judgment of the similarity of images since the features is invalidated when a predetermined number of reference images or more are stored for the features, and said features is not used for subsequent determination processes as the features which is invalid for a processing of judging whether an inputted document image is similar to any one of reference images stored in advance or not. In the meantime, the accuracy of judgment of a similar reference image may change depending on the number of reference images since the features, which normally should be invalidated, may not be invalidated when, for example, the number of reference images is small, although the features to be invalidated is invalidated when the number of reference images is large. Accordingly, the accuracy of matching in judgment of the similarity of images can be maintained stably even when the number of reference images is small, by preliminarily invalidating the features extracted from a predetermined image.

The above and further objects and features of the invention will more fully be apparent from the following detailed description with accompanying drawings.

BRIEF DESCRIPTION OF THE SEVERAL VIEWS OF THE DRAWINGS

FIG. 4 is an explanation diagram showing an example of the filter coefficient of the filtering section;

FIGS. 10A and 10B are explanatory diagrams showing the structure of a hash table;

FIGS. 11A, 11B and 11C are explanatory diagrams showing the structure of a hash table;

FIG. 12 is an explanatory diagram showing an example of similarity judgment based on voting result;

FIGS. 13A and 13B are flow charts showing a procedure of document storage processing;

DETAILED DESCRIPTION

Figure 1:
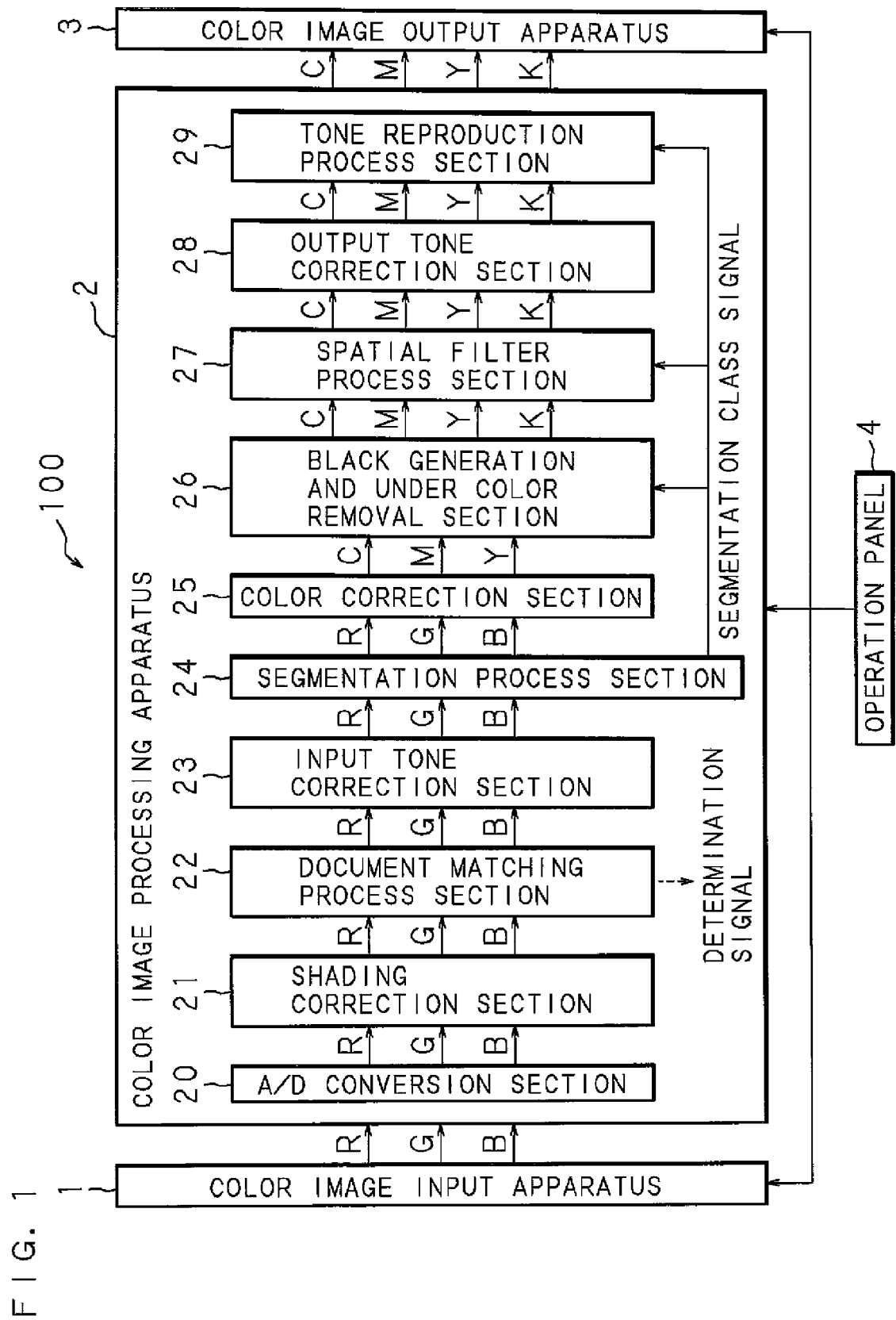
FIG. 1 is a block diagram showing the configuration of an image forming apparatus employing an image processing apparatus according to the present invention.

The following description will explain the present invention with reference to the drawings illustrating some embodiments thereof. FIG. 1 is a block diagram showing the configuration of an image forming apparatus 100 employing an image processing apparatus according to the present invention. The image forming apparatus 100 (e.g., a digital color copying machine or a multi-function peripheral provided with combined functions such as a printer function and a facsimile and e-mail distribution function) includes a color image input apparatus 1, a color image processing apparatus 2 (an image processing apparatus), a color image output apparatus 3, and an operation panel 4 for various kinds of operation. Image data of analog signals of RGB (R: red, G: green, B: blue) obtained when the color image input apparatus 1 reads a document is outputted to the color image processing apparatus 2, then processed by predetermined processing in the color image processing apparatus 2, and then outputted to the color image output apparatus 3 as digital color signals of CMYK (C: cyan, M: magenta, Y: yellow, K: black).

The color image input apparatus 1 is, for example, a scanner provided with a CCD(Charged Coupled Device). The color image input apparatus 1 reads a reflected light image from the document image in the form of analog signals of RGB, and then outputs the read RGB signals to the color image processing apparatus 2. Further, the color image output apparatus 3 is a printer employing an electrophotography method or an inkjet method for outputting the image data of the document image onto a recording paper. Further, the color image output apparatus 3 may be a display unit such as a LCD display.

The color image processing apparatus 2 includes an A/D conversion section 20, a shading correction section 21, a document matching process section 22, an input tone correction section 23, a segmentation process section 24, a color correction section 25, a black generation and under color removal section 26, a spatial filter process section 27, an output tone correction section 28, a tone reproduction process section 29, a CPU(Central Processing Unit) controlling operations of these hardware sections, and the like. The color image processing apparatus 2 is constituted of an ASIC (Application Specific Integrated Circuit) or the like.

The A/D conversion section 20 converts the RGB signals inputted from the color image input apparatus 1 into, for example, 10-bit digital signals, and then outputs the converted RGB signals to the shading correction section 21.

The shading correction section 21 performs correction processing in which various kinds of distortion generated in the illumination system, the image focusing system, and the image sensing system of the color image input apparatus 1 is removed from the inputted RGB signals, and then outputs the converted RGB signals to the document matching process section 22. The shading correction section 21 also performs the processing of adjusting the color balance and performs the processing of converting the signals into those such as a density signal (pixel value) easily treated by the image processing system adopted in the color image processing apparatus 2

The document matching process section 22 binarizes an inputted image, calculates a feature point of a connected component identified on the basis of a binarized image and judges, using plural kinds of features calculated from the feature point, the similarity between an inputted image and a reference image. When it is judged that the image is similar, the document matching process section 22 outputs a determination signal indicative of whether execution of a processing for the similar document is permitted or not. For example, the document matching process section 22 outputs a determination signal "0" when outputting, copying, filing into a predetermined folder or the like of a document which is judged to be a similar document is inhibited, or outputs a determination signal "1" when the above operation is not inhibited. It should be noted that whether execution of the processing for each similar document is permitted or not is prestored.

In this manner, the image forming apparatus 100 can cancel or execute various processes, execution of which has been instructed, for an inputted image depending on whether said inputted image is similar to a reference image or not and can perform matching of an image and the processing depending on matching result. The document matching process section 22 outputs the inputted RGB signals to the input tone correction section 23 at a subsequent stage without any modification.

The input tone correction section 23 performs image quality adjustment processing such as page background density removing or contrasts on the RGB signals after removing various kinds of distortion by the shading correction section 21 and then outputs the processed RGB signals to the segmentation process section 24.

On the basis of the inputted RGB signals, the segmentation process section 24 separates respective pixels of the inputted image into a text component, a halftone component, and a photograph (continuous tone) component. On the basis of the segmentation result, the segmentation process section 24 outputs a segmentation class signal indicating that each pixel belongs to which segment, to the black generation and under color removal section 26, the spatial filter process section 27, and the tone reproduction process section 29. Further, the segmentation process section 24 outputs the inputted RGB signals to the color correction section 25 of the subsequent stage without any modification.

The color correction section 25 converts the inputted RGB signals into the color space of CMY, then performs color correction in accordance with the characteristics of the color image output apparatus 3, and then outputs the corrected CMY signals to the black generation and under color removal section 26. Specifically, for the purpose of high fidelity in color reproduction, the color correction section 25 performs the processing of removing color impurity on the basis of the spectral characteristics of the CMY color materials containing unnecessary absorption components.

On the basis of the CMY signals inputted from the color correction section 25, the black generation and under color removal section 26 generates a K (black) signal and, at the same time, subtracts the K signal from the inputted CMY signals so as to generate new CMY signals, and then outputs the generated CMYK signals to the spatial filter process section 27.

An example of processing in the black generation and under color removal section 26 is described below. For example, in the case of processing of black generation by using skeleton black, the input-output characteristics of the skeleton curve is expressed by $y=f(x)$, input data is denoted by C, M, and Y, output data is denoted by C', M', Y', and K', and the UCR (Under Color Removal) ratio is denoted by $\alpha$ ($0<\alpha<1$). Then, data outputted in the black generation and under color removal process is expressed by $K'=f\{min(C,M,Y)\}$, $C'=C-\alpha K'$, $M'=M-\alpha K'$, and $Y'=Y-\alpha K'$.

The spatial filter process section 27 performs spatial filtering by means of a digital filter based on the segmentation class signal, onto the CMYK signals inputted from the black generation and under color removal section 26. By performing spatial filtering process, the spatial frequency characteristics of the image data is corrected so that blur occurrence or graininess degradation is prevented in the output image in the color image output apparatus 3. For example, in order to improve the reproducibility of, especially, black characters (texts) or color characters, the spatial filter process section 27 performs edge enhancement processing so as to emphasize high frequency components for the segment separated into a text component by the segmentation process section 24. Further, the spatial filter process section 27 performs low pass filtering for removing the input halftone components, onto the segment separated into a halftone component by the segmentation process section 24. The spatial filter process section 27 outputs the processed CMYK signals to the output tone correction section 28.

The output tone correction section 28 performs output tone correction process of converting the CMYK signals inputted from the spatial filter process section 27 into a halftone screen area ratio which is a characteristic value of the color image output apparatus 3. Then, the output tone correction section 28 outputs the CMYK signals which is carries out the output tone correction process to the tone reproduction process section 29.

On the basis of the segmentation class signal inputted from the segmentation process section 24, the tone reproduction process section 29 performs predetermined processing on the CMYK signals inputted from the output tone correction section 28. For example, in order to improve the reproducibility of, especially, black characters or color characters, the tone reproduction process section 29 performs binarization process or multi-level dithering process on the segment separated into a text component, such that the signals should become appropriate for the reproduction of high frequency components in the color image output apparatus 3.

Further, the tone reproduction process section 29 performs tone reproduction process (halftone generation) on the segment separated into a halftone component by the segmentation process section 24, such that the image is finally separated into pixels so that each tone of the pixels can be reproduced. Further, the tone reproduction process section 29 performs binarization processing or multi-level dithering processing on the segment separated into a photograph component by the segmentation process section 24, such that the signals should become appropriate for the tone reproduction in the color image output apparatus 3.

The color image processing apparatus 2 temporarily stores into a storage section (not shown) the image data (CMYK signals) processed by the tone reproduction process section 29. Then, in a predetermined timing of performing image formation, the color image processing apparatus 2 reads the image data stored in the storage section, and then outputs the read image data to the color image output apparatus 3. Control for process described above is performed, for example, by a CPU (not shown).

The operation panel 4 is constructed from a display section such as a liquid crystal display, setting buttons and the like. The operations of the color image input apparatus 1, the color image processing apparatus 2 and the color image output apparatus 3 are controlled on the basis of information inputted from the operation panel 4 (for example designation of document storing mode for storing documents, optional selection of output processing such as filing, copying, electronic distribution or the like with respect to document image, and the like).

Figure 2:
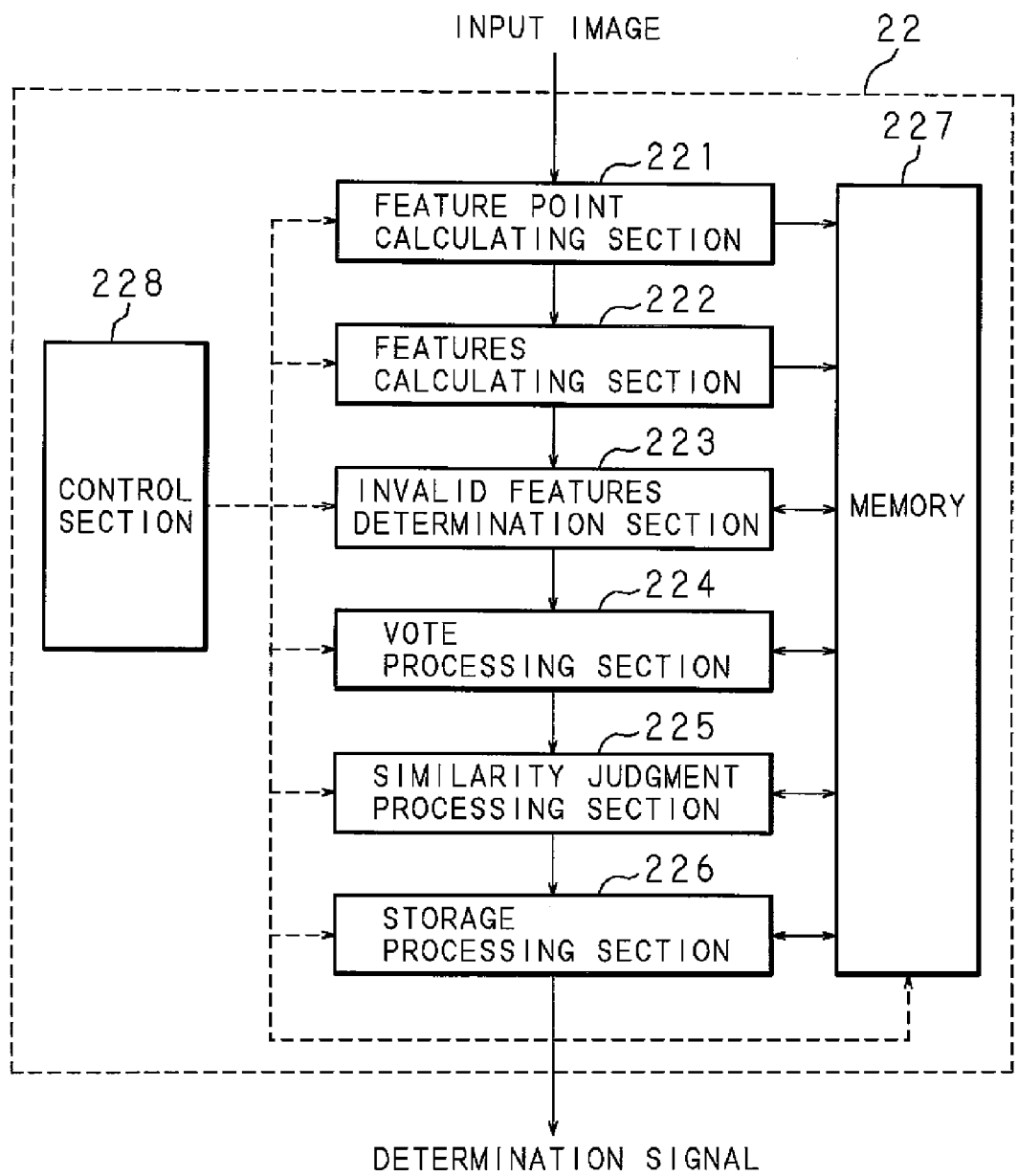
FIG. 2 is a block diagram showing the configuration of the document matching process section.

FIG. 2 is a block diagram showing the configuration of the document matching process section 22. The document matching process section 22 includes a feature point calculating section 221, a features calculating section 222, an invalid features determination section 223, a vote processing section 224, a similarity judgment processing section 225, a storage processing section 226, a memory 227, a control section 228 for controlling these sections, and the like.

The feature point calculating section 221 performs later-described predetermined processing on the inputted image, and binarizes the inputted image, extracts (calculates) a feature point (e.g., a value obtained by accumulating the coordinate values of the respective pixels constituting a connected component in the binary image and by dividing the accumulated coordinate values with the number of pixels contained in the connected component) of the connected component specified on the basis of the binary image. The feature point calculating section 221 causes the memory 227 store the extracted feature point and outputs the extracted feature point to the features calculating section 222.

Figure 3:
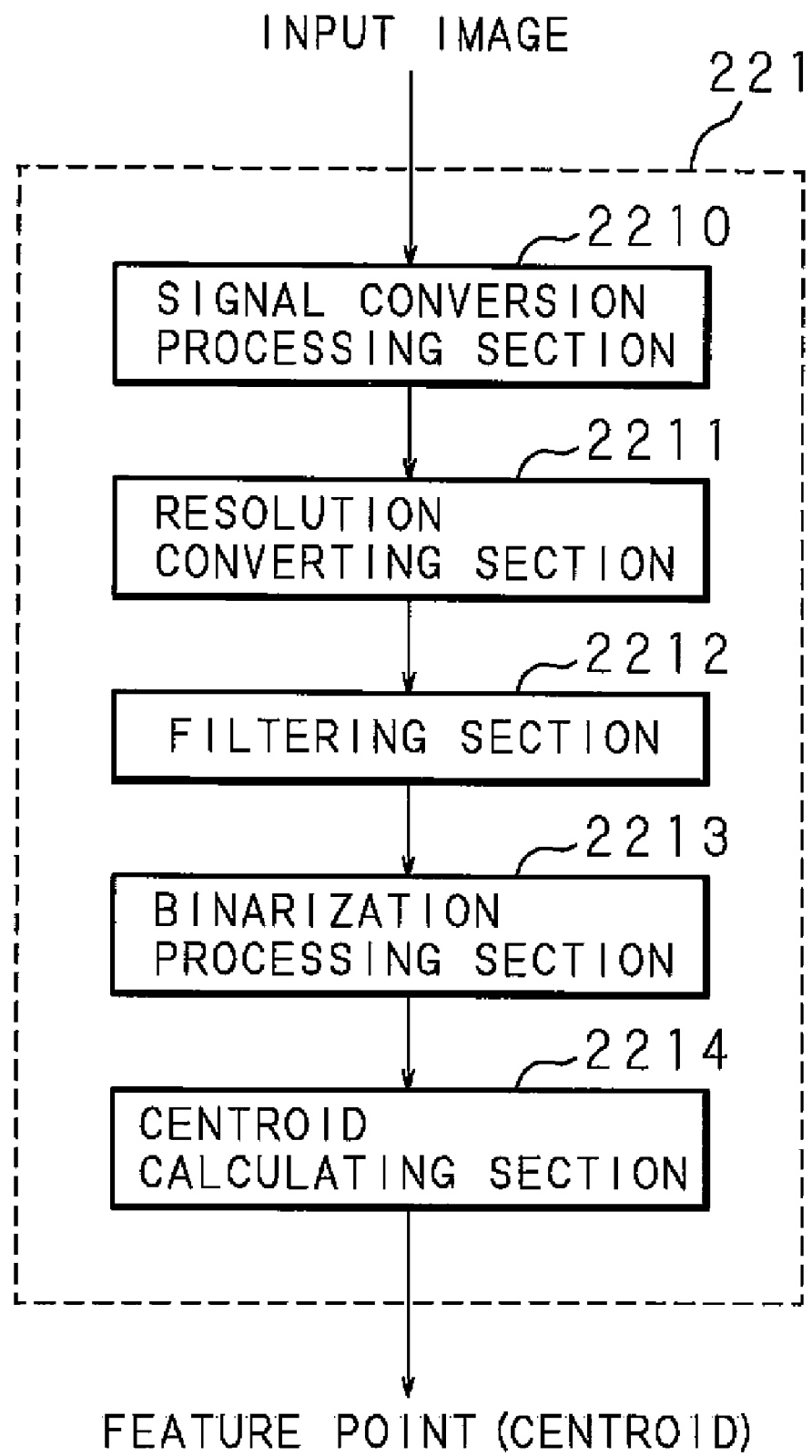
FIG. 3 is a block diagram showing the configuration of the feature point calculating section.

FIG. 3 is a block diagram showing the configuration of the feature point calculating section 221. The feature point calculating section 221 includes a signal conversion processing section 2210, a resolution converting section 2211, a filtering section 2212, a binarization processing section 2213, and a centroid calculating section 2214.

When the inputted image is a color image, the signal conversion processing section 2210 achromatizes and converts the color image into a luminance signal or a lightness signal, and then outputs the converted image to the resolution converting section 2211. For example, when the color components RGB of each pixel is denoted respectively by Rj, Gj, and Bj, the luminance signal Yj is expressed by Yj=0.30×Rj+ 0.59×Gj+0.11×Bj. Here, the present invention is not limited to this formula. That is, the RGB signals may be converted into CIE1976L*a*b* signals.

Even when the inputted image is one having undergone optical magnification change in the color image input apparatus 1, the resolution converting section 2211 performs magnification change on the inputted image again such as to realize a predetermined resolution, and then outputs to the filtering section 2212 the image having undergone the magnification change. By virtue of this, even when magnification change processing has been performed by the color image input apparatus 1 so that the resolution has varied, extraction of a feature point is achieved free from its influence. This permits accurate classification of the document. In particular, in the case of size-reduced characters, a possibility is avoided that when a connected component is to be specified by binarization processing, blotted characters cause intrinsically separated regions to be specified as if they are connected to each other so that the calculated centroid may deviate. Further, the resolution converting section 2211 converts the image into that of a resolution smaller than the resolution obtained when the image is read by the color image input apparatus 1 with unity magnification. For example, an image read at 600 dpi (dot per inch) by the color image input apparatus 1 is converted into that of 300 dpi. This reduces the amount of processing in the subsequent stage.

The filtering section 2212 corrects the spatial frequency characteristics of the inputted image (e.g., enhancement processing and smoothing of the image), and then outputs the corrected image to the binarization processing section 2213. Since the spatial frequency characteristics of the color image input apparatus 1 is different depending on each model, the filtering section 2212 corrects the different spatial frequency characteristics into required characteristics. In the image (e.g., image signal) outputted from the color image input apparatus 1, degradation such as blurring in the image is caused by, for example: optical system components such as lenses and mirrors; the aperture ratio, the transfer efficiency, and the after-image of the light acceptance surface of CCD; and the storage effect and the scanning unevenness caused by the physical scan. The filtering section 2212 performs enhancement processing on the boundary or the edges so as to restore degradation such as blurring generated in the image. Further, the filtering section 2212 performs smoothing for suppressing high frequency components which are unnecessary in the feature point extracting processing performed in the subsequent stage. This permits accurate extraction of a feature point, and hence achieves accurate judgment of the similarity of the image. Here, the filter coefficient used in the filtering section 2212 may be set up appropriately in accordance with the model, the characteristics, or the like of the employed color image input apparatus 1.

FIG. 4 is an explanation diagram showing an example of the filter coefficient of the filtering section 2212. As shown in the figure, the spatial filter is, for example, a filter that has a size of 7×7 (seven rows by seven columns) and that performs enhancement processing and smoothing processing. The pixels of the inputted image are scanned so that arithmetic processing by the spatial filter is performed on all the pixels. Here, the size of the spatial filter is not limited to the size of 7×7. That is, the size may be 3×3, 5×5, or the like. Further, the numerical value of the filter coefficient is an example. That is, the actual value is not limited to this example, and may be set up appropriately in accordance with the model, the characteristics, or the like of the employed color image input apparatus 1.

The binarization processing section 2213 compares with a threshold value the luminance value (the luminance signal) or the lightness value (the lightness signal) of the inputted image so as to binarize the image, and then outputs to the centroid calculating section 2214 the binary image having undergone the binarization.

On the basis of the binarization information (e.g., expressed by "1" and "0") of each pixel of the binary image inputted from the binarization processing section 2213, the centroid calculating section 2214 performs labeling (label attaching processing) on each pixel. Then, the centroid calculating section 2214 specifies a connected component where pixels having the same label are in succession, then extracts as a feature point the centroid of the specified connected component. The centroid calculating section 2214 lets the memory 227 store the extracted feature point and outputs the extracted feature point to the features calculating section 222. Here, the feature point is expressed by the coordinates (x-coordinate, y-coordinate) in the binary image.

Figure 5:
FIG. 5 is an explanation diagram showing an example of a feature point of a connected component.

FIG. 5 is an explanation diagram showing an example of a feature point of a connected component. In the figure, the specified connected component is a character "A", and is specified as a set of pixels to which the same label is imparted. A feature point (centroid) of this character "A" is located at a position (x-coordinate, y-coordinate) indicated by a black dot in the figure.

Figure 6:
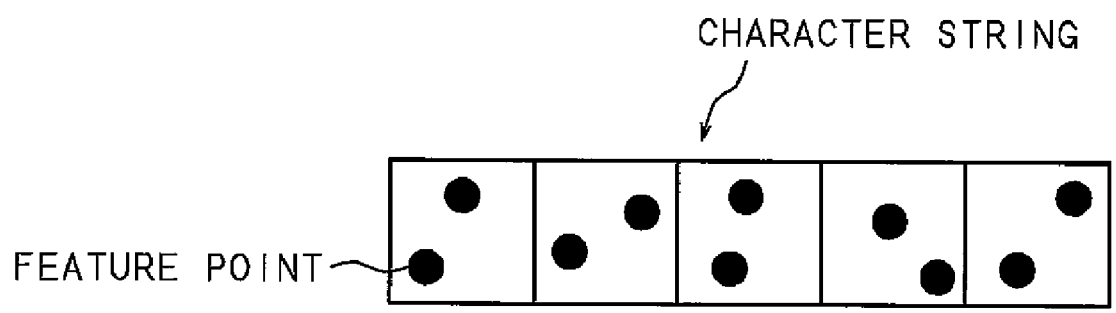
FIG. 6 is an explanation diagram showing an example of a result of extraction of a feature point for a character string.

FIG. 6 is an explanation diagram showing an example of a result of extraction of a feature point for a character string. In the case of a character string composed of a plurality of characters, a plurality of feature points are extracted that have different coordinates depending on the kinds of characters.

The features calculating section 222 adopts, as a current feature point, each feature point (that is, coordinate values of the centroid of the connected component) inputted from the feature point calculating section 221, and then extracts, for example, surrounding four feature points having smaller distances from the current feature point.

Figure 7:
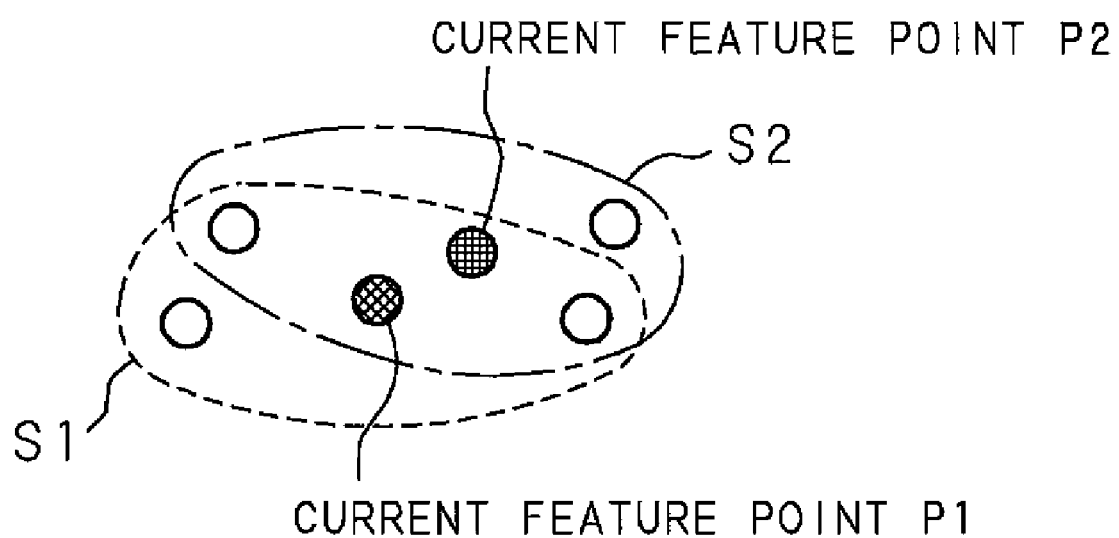
FIG. 7 is an explanation diagram showing current feature points and surrounding feature points.
Figure 8A:
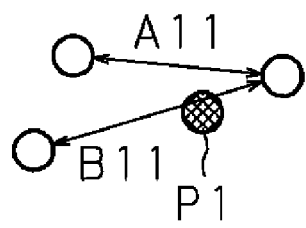
FIGS. 8A, 8B, 8C and 8D are explanatory diagrams showing an example of calculation of an invariant with respect to a current feature point.
Figure 8B:
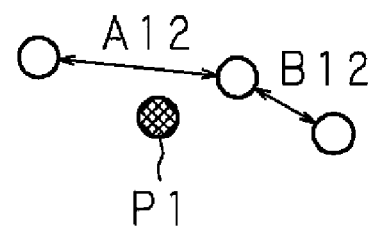
Figure 8C:
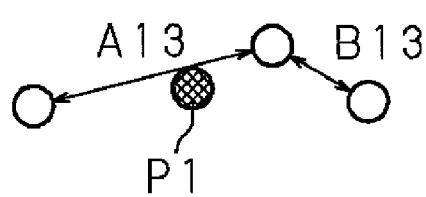
Figure 8D:
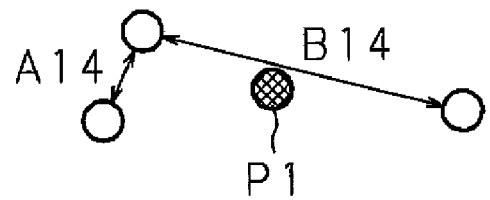
Figure 9A:
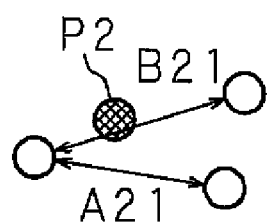
FIGS. 9A, 9B, 9C and 9D are explanation diagrams showing an example of calculation of an invariant with respect to the current feature point.
Figure 9B:
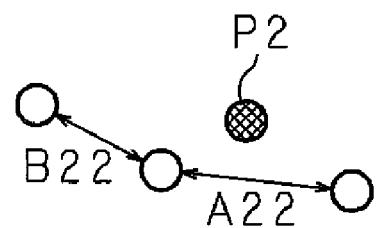
Figure 9C:
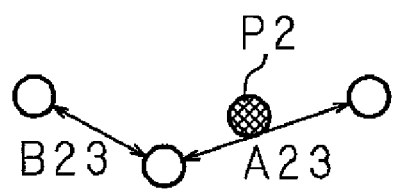
Figure 9D:
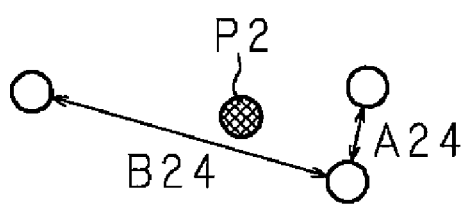

FIG. 7 is an explanation diagram showing current feature points and surrounding feature points. As shown in the figure, for example, four feature points surrounded by a closed curve S1 are extracted for a current feature point P1 in order of distance from the current feature point P1 (for the current feature point P1, a current feature point P2 also is extracted as one feature point). Further, for the current feature point P2, for example, four feature points surrounded by a closed curve S2 are extracted in order of distance from the current feature point P2 (for the current feature point P2, the current feature point P1 also is extracted as one feature point).

The features calculating section 222 selects three feature points from the four extracted feature points so as to calculate an invariant. Here, the number of selected feature points is not limited to three. That is, four, five, or the like feature points may be selected. The number of feature points to be selected differs according to the kind of desired invariant. For example, an invariant calculated from three points is a similarity invariant (invariable parameter with respect to geometric change including rotation, parallel movement and expansion/reduction).

FIGS. 8A, 8B, 8C and 8D are explanatory diagrams showing an example of calculation of an invariant with respect to a current feature point P1. FIGS. 9A, 9B, 9C and 9D are explanation diagrams showing an example of calculation of an invariant with respect to the current feature point P2. As shown in FIGS. 8A, 8B, 8C and 8D, three feature points are selected from the four feature points surrounding the current feature point P1. Then, four kinds of invariants are denoted respectively by $H1j$ ($j=1, 2, 3, 4$). The combination and the order for selecting three feature points from four feature points are preset uniquely depending on the distance from the current feature point P1. Each invariant $H1j$ is calculated by a formula expressed by $H1j=A1j/B1j$. Here, each of $A1j$ and $B1j$ indicates the distance between feature points. Thus, for example, even when the document is rotated, moved, or inclined, the invariant $H1j$ does not vary. Accordingly, judgment of the similarity of the image is achieved with satisfactory accuracy.

Similarly, as shown in FIGS. 9A, 9B, 9C and 9D, three feature points are selected from the four feature points surrounding the current feature point P2. Then, four kinds of invariants are denoted respectively by $H2j$ ($j=1, 2, 3, 4$). The combination and the order for selecting three feature points from four feature points are preset uniquely depending on the distance from the current feature point P2. Each invariant $H2j$ is calculated by a formula expressed by $H2j=A2j/B2j$. Here, each of $A2j$ and $B2j$ indicates the distance between feature points. In accordance with a similar procedure, invariants can be calculated for the other current feature points.

On the basis of the invariants calculated for each current feature point, the features calculating section 222 calculates a hash value (features, feature vectors) Hi. The hash value Hi of the current feature point P1 is expressed by $Hi=(Hi1\times10^3+Hi2\times10^2+Hi3\times10^1+Hi4\times10^0)/D$. Here, D is a constant determined by how large remainder is expected. For example, when D is set to be "10", the remainder falls between "0" and "9". This gives the range that can be taken by the calculated hash value. Further, i is a natural number. Here, the above-mentioned hash value serving as features is an example, and is not limited to this. Another hash function may be employed. The above-mentioned example has been described for the case that four points are extracted as other surrounding feature points. However, the number of points is not limited to four. For example, six points may be extracted. In this case, five points may be extracted from the six feature points. Then, for each of the six kinds of methods of extracting five points, invariants may be calculated by extracting three points from the five points, so that a hash value may be calculated.

The invalid features determination section 223 determines whether each hash value, which is calculated by the features calculating section 222 for each current feature point, is a hash value which has already been invalidated or not on the basis of the storage content of a hash table which will be described later, and outputs determination result to the vote processing section 224. When the document matching process section 22 stores the image of a document for judgment of the similarity of images, i.e., when a document storing mode for storing a document is specified with the operation panel 4, the vote processing section 224 and the similarity judgment processing section 225 perform no process and outputs a hash value calculated for each current feature point by the features calculating section 222 or determination result outputted by the invalid features determination section 223 to the storage processing section 226.

In the case of a document storing mode, the storage processing section 226 sets a document page index (e.g., ID1, ID2, . . . ) of a reference image and stores a hash value (e.g., H1, H2, . . . ) calculated for each reference image in the process described above and a set document page index in a hash table. It should be noted that the document page index is for discriminating individual reference images and discriminating the respective pages of a document. It should be noted that the storage processing section 226 performs no process and outputs the determination signal outputted from the similarity judgment processing section 225 without any modification when a document matching process is to be performed, i.e., when execution of a process for a document image has been specified with the operation panel 4.

FIGS. 10A and 10B are explanatory diagrams showing the structure of a hash table. As shown in FIGS. 10A and 10B, the structure of the hash table is constructed from individual fields consisting of the hash value and the document page index. More specifically, in correspondence to a document page index, a point index which indicates a position in the document and an invariant are stored. For the purpose of judgment of similarity of the image, matching information for the image, document image, or the like to be matched is stored into the hash table in advance. The hash table is stored in the memory 227. Here, as shown in FIG. 10B, when hash values are equal to each other (H1=H5), the two entries in the hash table may be unified.

Here, when feature points having the same features are included in a plurality of different documents, i.e., when indexes (document page indexes) of a plurality of different documents are stored for one features (hash value) in the hash table, the following phenomenon is observed. First, since a plurality of different document page indexes are stored in the hash table for one features, the number of document page indexes stored for said features becomes remarkably large in comparison with the number of document page indexes stored for other features.

Moreover, when matching is carried out for a specific document including a large number of feature points having the features, in association with which a large number of document page indexes are stored, as described, the number of votes obtained for a plurality of documents from which said feature points is extracted, in particular, documents corresponding to a document page index which is stored in the hash table in association with said feature points, is significantly increased in a voting process by the vote processing section 224, which will be described later. In a state where all of the documents for which matching should be carried out are stored, it is possible to judge the similarity of images even when the above phenomenon arises, since votes concentrate more on a document which normally should be judged to be similar. However, in a state where any one of documents for which matching should be carried out is not stored, there is a possibility that the above phenomenon causes incorrect judgment of a document, which is not stored, to be similar to any one of reference images when it is necessary to judge that a document, which is not stored, is not stored.

Consequently, in the present embodiment, in order to avoid the phenomenon described above, the number of document page indexes which can be stored in the hash table for one hash value is limited to a preliminarily setup upper limit value and a hash value over the upper limit value is invalidated, so that it is impossible to vote therefor in image matching. In particular, the storage processing section (determination means) 226 determines whether the number of document page indexes prestored in association with each hash value is larger than or equal to a preliminarily setup upper limit value (predetermined number) or not, in storing of a document page index of a reference image in association with a hash value calculated for each reference image by the features calculating section 222. The storage processing section 226 stores a document page index of a reference image in association with a hash value which is calculated for each reference image by the features calculating section 222 when the number of document page indexes is smaller than the upper limit value. The storage processing section (invalidating means) 226 invalidates said hash value when the number of document page indexes is larger than or equal to the upper limit value.

When the storage processing section 226 obtains determination result that a hash value calculated by the features calculating section 222 an invalid hash value from the invalid features determination section 223 the storage processing section 226 does not perform a process of determining whether the number of document page indexes prestored in association with said hash value is larger than or equal to the upper limit value or not.

FIGS. 11A, 11B and 11C are explanatory diagrams showing the structure of a hash table. The hash table shown in FIG. 11A is constructed so that a document page index cannot be stored in association with a hash value (H3 in FIG. 11A), which is invalidated by the storage processing section 226, in the hash table shown in FIG. 10A. It should be noted that a form of holding only a hash value (invalid hash value) invalidated by the storage processing section 226 in the memory 227 as shown in FIG. 11B may be employed. Moreover, as shown in FIG. 11C, a form of providing a 1-bit flag indicative of whether a hash value is an invalid hash value or not for all hash values in the hash table shown in FIG. 10A, setting a flag corresponding to an invalid hash value to "1" and holding whether each hash value is invalidated or not may be employed.

As described above, it is possible to avoid a phenomenon of incorrect judgment that a document which is not stored is similar to any one of reference images even in a state where any one of documents for which matching should be carried out is not stored, by invalidating a hash value, in association with which document page indexes of a plurality of different documents are stored, and not using said hash value for voting. It should be noted that the accuracy of determination of matching may possibly vary depending on the number of reference documents in this case since different hash values are invalidated in the case where the number of documents stored in the hash table is large and in the case where the same is small.

Accordingly, in the present embodiment, variation of the accuracy of determination depending on the number of reference documents is avoided by preliminarily performing the same process as a storage process for a general document, extracting features, in association with which a large number of document page indexes are stored, as described above, and prestoring said features as an invalid hash value. Moreover, when there is a document which has turned out to cause incorrect matching before, the features common in documents which have caused incorrect matching before may be extracted by carrying out a process equivalent of a storage process and stored as an invalid hash value. It should be noted that an invalid hash value which has been extracted before and a hash value which is invalidated during storing of a reference image are stored in the memory 227 by input through the operation panel 4. Said operation is performed before factory shipment or during maintenance by a serviceperson.

The invalid features determination section 223 determines whether each hash value, which is calculated for each current feature point by the features calculating section 222, is a hash value which has already been invalidated or not on the basis of a storage content of the hash table shown in FIG. 11A or 11C or an invalid hash value stored in the memory 227 as shown in FIG. 11B and outputs determination result to the vote processing section 224.

In the case of a document matching process for judging whether a document image is similar to a prestored reference image or not, when acquiring determination result that a hash value calculated by the features calculating section 222 is not an invalid hash value from the invalid features determination section 223, the vote processing section 224 retrieves the hash table stored in the memory 227 on the basis of said hash value. When the hash value matches, the vote processing section 224 votes for a document (i.e., an image having a matching hash value) of an index stored for the hash value. It should be noted that, when acquiring determination result that the hash value calculated by the features calculating section 222 is an invalid hash value from the invalid features determination section 223, the vote processing section 224 does not retrieve the hash table on the basis of said hash value or vote. The vote processing section 224 outputs the number of votes obtained by accumulation to the similarity judgment processing section 225 as voting result.

The similarity judgment processing section 225 judges to which reference image a document image (image) is similar on the basis of voting result inputted from the vote processing section 224 and outputs a determination signal indicative of whether execution of a process (e.g., copy inhibition or storage in a predetermined folder) is permitted or not to the storage processing section 226 in association with the determination result, in particular, a reference image which has been judged to be similar. In particular, the similarity judgment processing section 225 compares the number of votes (number of votes obtained) inputted from the vote processing section 224 with a preset threshold, and judges that an input image is similar to a reference document and further determines that a document obtaining the largest number of votes obtained among documents which have been judged to be similar is the reference document, when the number of votes obtained is larger than or equal to the threshold.

When it is determined that an image matching with the input image is included in the images of a prestored document, the similarity judgment processing section 225 outputs a determination signal "1" to the storage processing section 226 when execution of a process is permitted in association with a reference image which has been judged to be similar. On the other hand, when execution of a process is not permitted in association with a reference image which has been judged to be similar, the similarity judgment processing section 225 outputs a determination signal "0" to the storage processing section 226. It should be noted that, when the number of votes obtained from the vote processing section 224 is smaller than the threshold, the similarity judgment processing section 225 judges that there is no similar document and outputs the result (determination signal "0"). In the case of a document matching process, the storage processing section 226 performs no process and outputs a determination signal outputted from the similarity judgment processing section 225 without any modification.

FIG. 12 is an explanatory diagram showing an example of similarity judgment based on voting result. The hash table is searched and vote is performed for each hash value calculated from the document image. Then, it is assumed that as a result, vote has been performed for the reference images in which the document page indexes are ID1, ID2, and ID3. Then a reference image having document page index ID1 is the only reference image obtaining the number of votes obtained, which is larger than or equal to the threshold Th, among the respective numbers of votes obtained N1, N2 and N3. Thus, the document image is judged as being similar to the reference image having the document page index ID1.

The determination method described above is an example, and there is another method of, for example, dividing the number of votes obtained, which is inputted from the vote processing section 224, with the largest number of votes obtained (represented by (the number of feature points)×(the number of hash values calculated from one feature point)) of a document image to calculate a normalized similarity; comparing the calculated similarity with a preset threshold Th (e.g., 0.8); and judging that the document image is similar to a reference image having the calculated similarity when the similarity is larger than or equal to the threshold Th, or judging that there is no reference image similar to the document image when the similarity is smaller than the threshold Th.

It should be noted that, though the example for calculating one hash value from one feature point is shown in FIGS. 8A, 8B, 8C, 8D, 9A, 9B, 9C and 9D as the simplest example, it is possible to calculate a plurality of hash values from one feature point when a method for selecting feature points neighboring a current feature point is changed. For example, there are six possible combinations of extraction of six feature points as feature points neighboring a current feature point and extraction of five feature points from said six feature points. There is also a method for calculating a hash value by extracting three feature points from five feature points and obtaining an invariant for each of said six combinations.

Figure 13A:
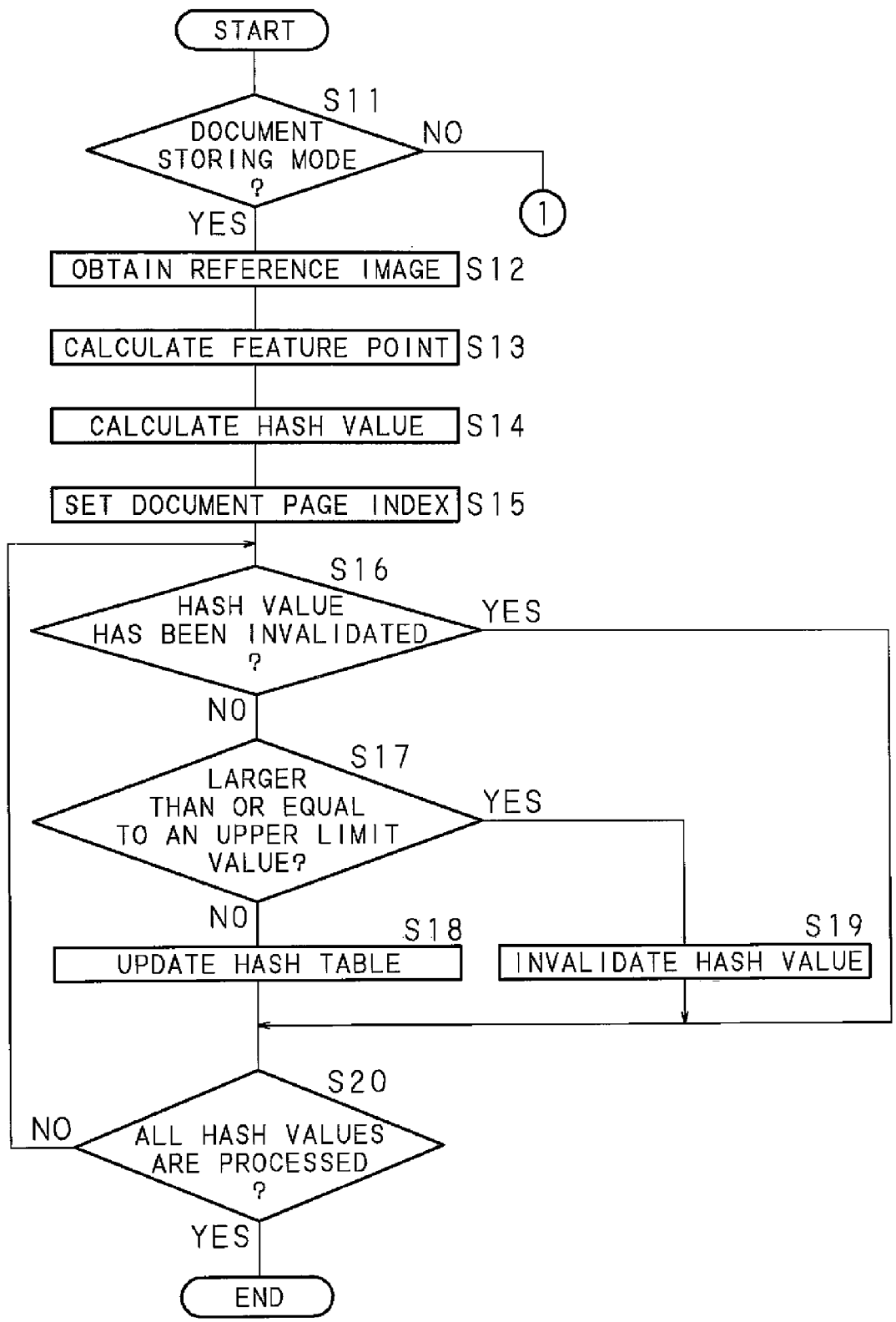

Next, the operation of the color image processing apparatus 2 is described below. FIGS. 13A and 13B are flow charts showing a procedure of document storage processing. Here, in addition to being performed by a dedicated hardware circuit such as the document matching process section 22, the document storage processing may be performed by a method in which a computer program that defines the procedure of document storage processing is loaded onto a personal computer having a CPU, a RAM, a ROM, and the like and then the computer program is executed by the CPU. In the following description, the color image processing apparatus 2 is referred to as a "processing section".

The processing section determines whether the mode is a document storing mode (S11). When the mode is not a document storing mode (NO at S11), the processing section goes to the processing in a step S21. When the mode is a document storing mode (YES at S11), the processing section obtains a reference image (S12). At that time, the reference image may be obtained by reading a document through a document reading apparatus. Alternatively, the reference image may be obtained by receiving electronic data generated by a processing apparatus such as a personal computer.

The processing section calculates a feature point of a reference image (S13) and calculates a hash value (features) on the basis of the calculated feature point (S14). The processing section sets a document page index of the reference image (S15) and determines whether the hash value calculated in the step S14 has already been invalidated or not (S16). When it is determined that the hash value has not been invalidated (NO in S16), the processing section determines whether the number of document page indexes which have already been stored in the hash table in association with said hash value is larger than or equal to an upper limit value or not (S17).

When it is determined that the number of document page indexes which have already been stored in the hash table in association with said hash value is smaller than the upper limit value (NO in S17), the processing section updates the hash table by storing the set document page index in the hash table in association with the calculated hash value (S18). When it is determined that the number of document page indexes which have already been stored in the hash table in association with said hash value is larger than or equal to the upper limit value (YES in S17), the processing section invalidates said hash value (S19). When it is determined that the hash value has already been invalidated (YES in S16), the processing section skips the processing in the steps S17 to S19.

The processing section determines whether processing described above for all of the hash values calculated in the step S14 has been completed or not (S20). When processing for any one of the hash values has not been completed (NO in S20), the processing section continues the processing beginning at the step S16 and performs the processing of storing an document page index in the hash table in association with a remaining hash value or the processing of invalidating a hash value. When processing for all of the hash values has been completed (YES in S20), the processing section terminates the processing described above.

On the other hand, when the mode is not a document storing mode (NO in S11), the processing section obtains a document image (S21). At that time, the document image may be obtained by reading a document through a document reading apparatus. Alternatively, the document image may be obtained by receiving electronic data generated by a processing apparatus such as a personal computer.

The processing section calculates a feature point of a document image (S22) and calculates a hash value (features) on the basis of the calculated feature point (S23). The processing section retrieves the hash table on the basis of the calculated hash value and performs voting for a document page index having the same hash value (S24). The processing section determines whether the number of votes obtained is larger than a threshold Th or not on the basis of the result of the voting (S25). When the number of votes obtained is larger than the threshold Th (YES in S25), the processing section judges whether a reference image which is similar to the document image is an image for which execution of a process is permitted or not (S26).

The processing section outputs a determination signal "1" (S27) when it is determined that execution of a process is permitted (YES in S26), or outputs a determination signal "0" (S28) when it is determined that execution of a process is not permitted (NO in S26). It should be noted that the processing section outputs a determination signal "0" (S28) when the number of votes obtained is not larger than the threshold Th (NO in S25).

Figure 14:
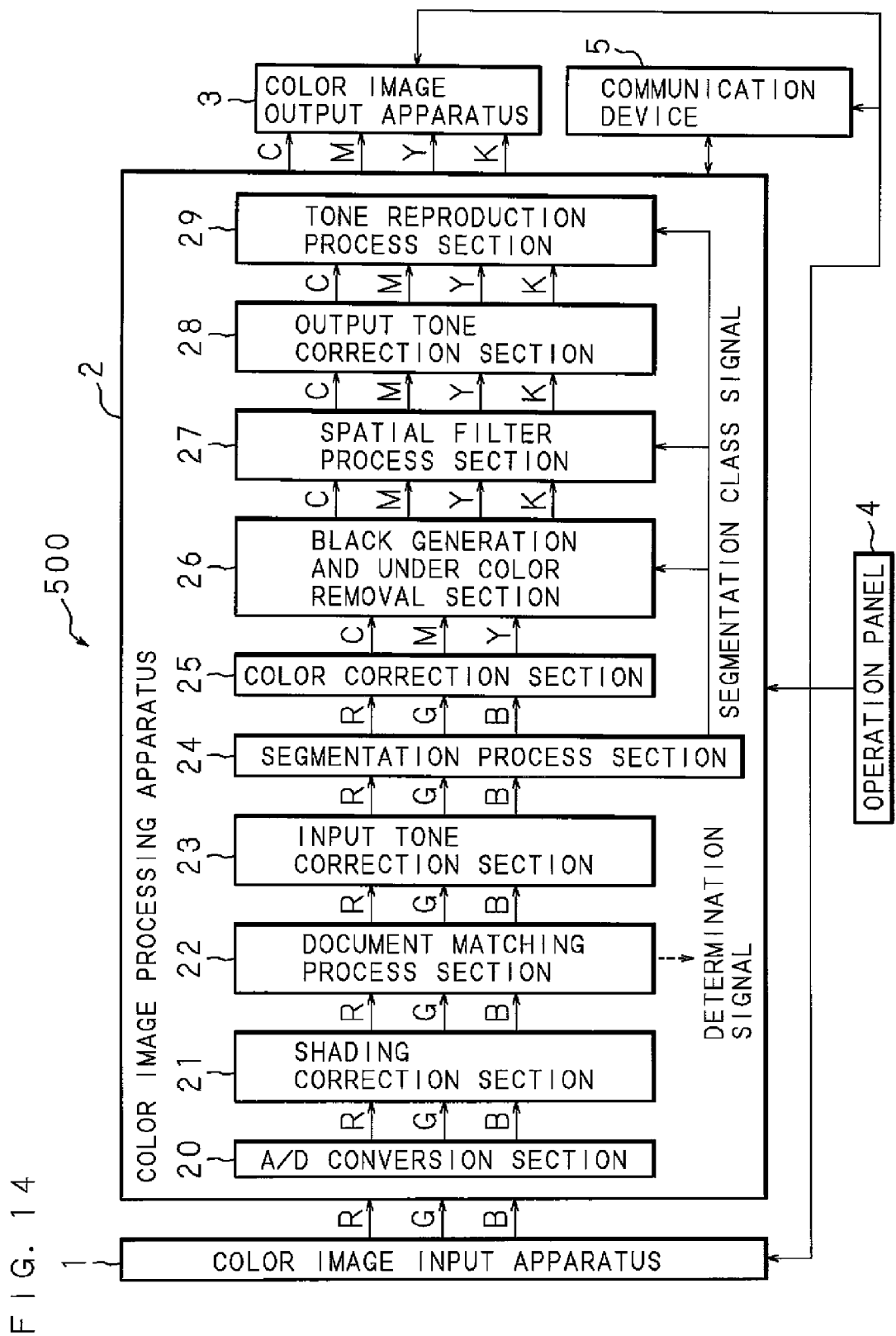
FIG. 14 is a block diagram showing the configuration of a digital color multi-function peripheral employing an image processing apparatus according to the present invention.

In the embodiment described above, as the image forming apparatus 100, a modem may be provided that serves as communication means for connecting with a server apparatus or the like via a network. FIG. 14 is a block diagram showing the configuration of a digital color multi-function peripheral 500 employing an image processing apparatus according to the present invention. As shown in FIG. 14, the digital color multi-function peripheral 500 includes a color image input apparatus 1, a color image processing apparatus 2, a color image output apparatus 3 and an operation panel 4 as well as a communication device 5. The color image input apparatus 1, the color image processing apparatus 2, the color image output apparatus 3 and the operation panel 4 are the same as those in the image forming apparatus 100 described above and explanation thereof will be omitted.

The communication device 5 is, for example, constituted of a modem. In the case of facsimile transmission, for example, the communication device 5 performs a procedure for transmission with destination at the modem, reads image data (image data read by a scanner) compressed in a predetermined format from a memory when a transmittable state is ensured, carries out a necessary process such as conversion of a compression format and sequentially transmits the image data to the destination via a communication line. In the case of facsimile reception, the communication device 5 receives image data transmitted from an originating communication device during communication procedure and outputs the image data to the color image processing apparatus 2, and the color image processing apparatus 2 carries out a decompression process for the received image data at a compression/decompression processing section which is not illustrated. The decompressed image data is outputted from the color image output apparatus 3 after, as needed, a rotation process, a resolution conversion process, an output tone correction process, a tone reproduction process or the like.

It should be noted that the communication device 5 may be constructed to communicate data with a computer, other digital multi-function peripherals or the like connected with a network, via a network card, a LAN cable or the like, for example. The present invention can also be applied to a multi-function peripheral for handling a monochrome image or a simplex facsimile communication device having only a facsimile communication function, besides a color multi-function peripheral.

Figure 15:
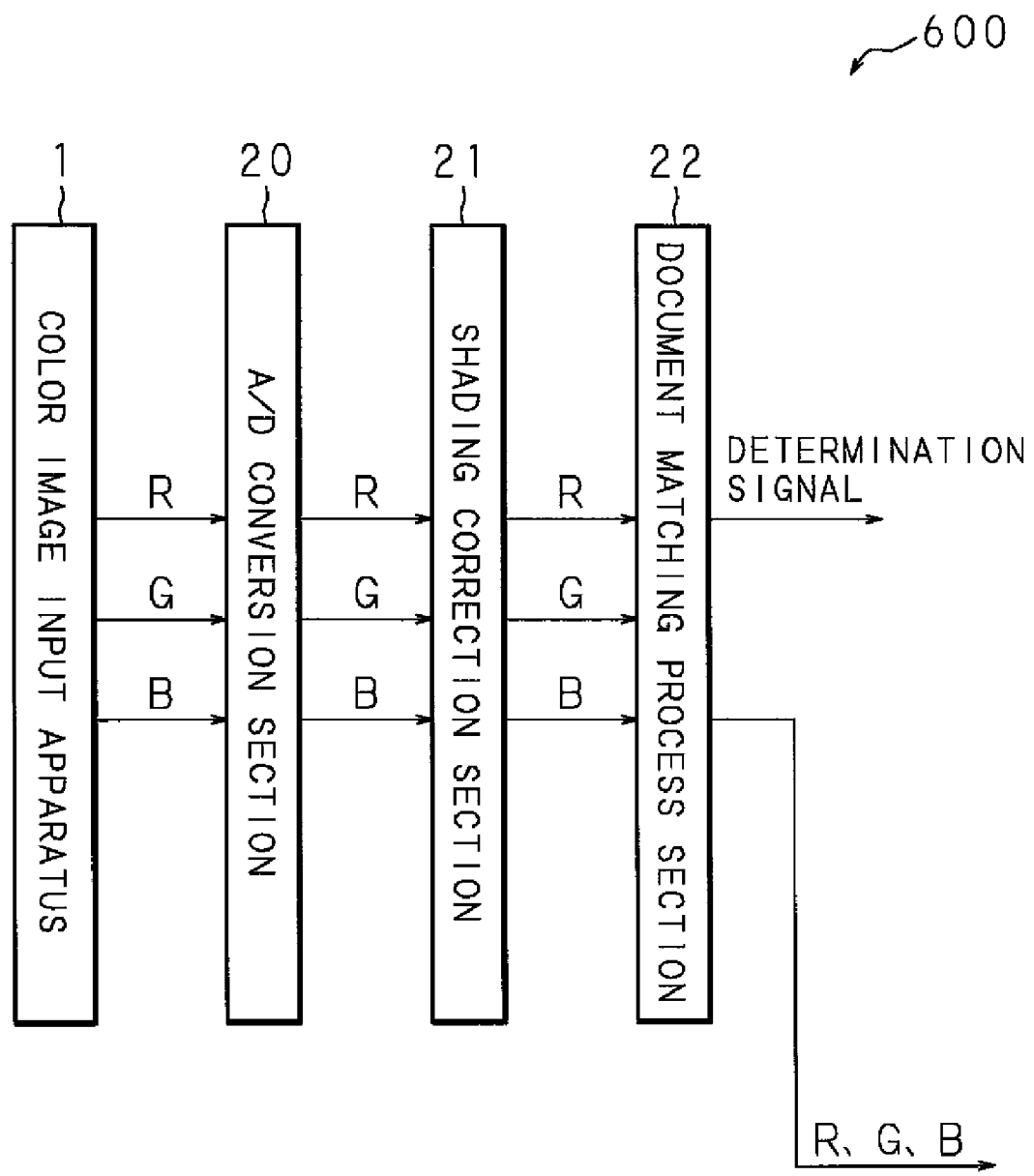
FIG. 15 is a block diagram showing the configuration of an image reading apparatus according to the present invention.

FIG. 15 is a block diagram showing the configuration of an image reading apparatus 600 according to the present invention. As shown in the FIG. 15, the image reading apparatus 600 includes a color image input apparatus 1, an A/D conversion section 20, a shading correction section 21, a document matching process section 22, and the like. The color image input apparatus 1, the A/D conversion section 20, the shading correction section 21, and the document matching process section 22 are similar to those of the above-mentioned image forming apparatus 100, and hence description is omitted.

As explained above, in the case of scanning of a document in, for example, a fixed form or the like to create a computerized document in the present invention, information for matching in the fixed form and page structure information of a document are prestored. Whether a document image is similar to a reference image or not is then judged and execution of the processing for the document image which is similar to the reference image can be permitted or inhibited. That is, when a document, for which inhibition of execution of processing is prestored, is read and a document image is inputted, it is possible to inhibit execution of processing for said document image without a special operation by the user. For example, copying of confidential documents is prevented.

It should be noted that processing to be executed for a document image is not limited to the examples of copying, electronic delivery, facsimile transmission and filing, and it is possible to control output processing for not the entire document image but a part of a document image in copying, electronic delivery, facsimile transmission or filing. For example, it is also possible to control the apparatus so as to inhibit copying or electronic delivery for a part of a fixed form where an important matter, a confidential matter or the like is described.

A determination signal outputted from the image reading apparatus 600 is transmitted to a printer or a multi-function peripheral via a network together with a read document image. Alternatively, the signal is inputted into a printer, via a computer or directly. In this case, since a signal representing the process content has to be determined at the printer, the multi-function peripheral or the computer, not a determination signal but the features may be outputted.

In the above-mentioned embodiment, the color image input apparatus 1 may be implemented by, for example, a flat-bed scanner, a film scanner, a digital camera, or a portable telephone. It should be noted that color image data may be obtained from an external storage section, a server machine or the like via a network instead of being obtained from the color image input apparatus 1. Further, the color image output apparatus 3 may be implemented by, for example: an image display device such as a CRT display and a liquid crystal display; or a printer employing an electrophotography method or an inkjet method that outputs the processing result onto a recording paper sheet or the like.

In the above-mentioned embodiment, the memory 227 and the control section 228 have been provided in the inside of the document matching process section 22. However, the present invention is not limited to this. That is, the memory 227 and the control section 228 may be provided in the outside of the document matching process section 22.

In the present invention, a computer program code for controlling a document matching process including document storage processing, document classification processing and output processing may be recorded on a computer-readable memory product for storing a program code of computer program (executable program, intermediate code program, and source program) to be executed by a computer. As a result, a memory product that stores a program code for controlling document storage processing, document classification processing and output processing is provided in a freely portable manner. In order that that processing can be performed by a microcomputer, the memory product may be a program medium such as a memory (not shown) like a ROM. Alternatively, a program media of another type may be employed in which a program reading device serving as an external storage device (not shown) is provided, and a memory product is inserted into there so that the memory product is read.

In each case, the stored computer program code may be accessed and executed directly by a microprocessor. Alternatively, the computer program code may be read, then the read computer program code may be downloaded into a program storage area (not shown) in a microcomputer, and then the computer program code may be executed. In this case, a computer program for download is stored in the main device in advance.

Here, the above-mentioned program medium is a memory product separable from the main body, and may be: a tape system such as a magnetic tape and a cassette tape; a disk system such as a magnetic disk (including a flexible disk and a hard disk) and an optical disk such as CD-ROM/MO/MD/DVD; a card system such as an IC card (including a memory card) and an optical card; and a medium that carries a computer program in a fixed manner, including a semiconductor memory such as a mask ROM, an EPROM (Erasable Programmable Read Only Memory), an EEPROM (Electrically Erasable Programmable Read Only Memory), and a flash ROM.

Further, in this case, since the employed system configuration permits connection to a communication network including the Internet, the memory product may carry the computer program code dynamically, for example, by means of downloading the computer program code from a communication network. Here, when the computer program code is to be downloaded from a communication network, a computer program for download may be stored in the main device in advance, or alternatively may be installed from another memory product. Here, the present invention may be implemented in the form of a computer data signal in which the above-mentioned program code is embedded in a carrier wave embodied by electronic transmission.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method comprising steps of:
   when an inputted image gets stored as a reference image in a storage section which stores plural kinds of features in association with a plurality of reference images,
   extracting features from the inputted image;
   determining whether at least a predetermined number of reference images have already been stored in the storage section in association with an extracted features or not;
   storing the inputted image in the storage section as a reference image in association with the extracted features when it is determined that a predetermined number of reference images have not been stored; and
   invalidating the features when it is determined that at least a predetermined number of reference images have already been stored,
   and then, when a document image is inputted,
   extracting features from an inputted document image; and
   judging whether the document image is similar to a reference image or not based on the features extracted from the document image and plural kinds of features which are not invalidated among features stored in the storage section.

2. An image processing apparatus comprising:
   a storage section which stores plural kinds of features in association with a plurality of reference images;
   an extraction section which, when a reference image gets stored in the storage section, extracts features from an inputted image, and when a document image is inputted, extracts features from the inputted document image;
   a determination section for determining whether at least a predetermined number of reference images have already been stored in the storage section in association with the features extracted by the extraction section from the inputted image or not;
   a storage processing section for storing the inputted image in the storage section as a reference image in association with the features extracted by the extraction section when it is determined by the determination section that a predetermined number of reference images have not been stored;
   an invalidating section for invalidating the features when it is determined by the determination section that at least a predetermined number of reference images have already been stored; and
   a judgment section which, when the document image is inputted, judges whether the document image is similar to a reference image or not based on the features extracted by the extraction section from the document image and plural kinds of features which are not invalidated by the invalidating section among features stored in the storage section.

3. The image processing apparatus as set forth in claim 2, wherein
   said extraction section extracts features from a predetermined image; and
   said invalidating section invalidates the features extracted by the extraction section from the predetermined image.

4. The image processing apparatus as set forth in claim 2, comprising:
   an invalid features storage section for storing features invalidated by the invalidating section; and
   a section for determining whether the features extracted by the extraction section from the inputted image is stored in the invalid features storage section or not, wherein
   said determination section determines whether at least a predetermined number of reference images are stored in the storage section in association with the features or not when the features is not stored in the invalid features storage section.

5. The image processing apparatus as set forth in claim 4, wherein
said judgment section comprises:
a section for determining whether the features extracted by the extraction section from the inputted document image is stored in the invalid features storage section or not; and
a vote processing section for voting for a reference image associated with the features when the features is not stored in the invalid features storage section, wherein
said judgment section judges that a reference image obtaining a larger number of votes is more similar to the document image.

6. An image forming apparatus comprising:
an image processing apparatus as set forth in claim 2; and
an image output apparatus for forming an output image based on the image processed by said image processing apparatus.

7. An image reading apparatus comprising:
an image input apparatus for reading a document image; and
an image processing apparatus as set forth in claim 2; wherein
said image processing apparatus processes the document image read by said image input apparatus.

8. A computer-readable memory product which stores a computer program, wherein
a computer comprises a storage section which stores plural kinds of features in association with a plurality of reference images;
said computer program comprises steps of:
causing the computer to extract features from an inputted image when the inputted image gets stored as a reference image in the storage section;
causing the computer to determine whether at least a predetermined number of reference images have already been stored in the storage section in association with an extracted features or not;
causing the computer to store the inputted image in the storage section as a reference image in association with the extracted features when it is determined that a predetermined number of reference images have not been stored;
causing the computer to invalidate the features when it is determined that at least a predetermined number of reference images have already been stored;
causing the computer to extract features from an inputted document image when the document image is inputted; and
causing the computer to judge whether the document image is similar to a reference image or not based on the features extracted from the document image and plural kinds of features which are not invalidated among features stored in the storage section.

* * * * *